US012804762B2

(12) United States Patent
Maeda

(10) Patent No.: US 12,804,762 B2
(45) Date of Patent: Nov. 17, 2026

(54) COMMUNICATION APPARATUS, INTEGRATED ACCESS AND BACKHAUL NODE, CONTROL METHOD, AND COMPUTER-READABLE STORAGE MEDIUM

(71) Applicant: CANON KABUSHIKI KAISHA, Tokyo (JP)

(72) Inventor: Yoichi Maeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 701 days.

(21) Appl. No.: 18/330,888

(22) Filed: Jun. 7, 2023

(65) Prior Publication Data

US 2023/0328837 A1 Oct. 12, 2023

Related U.S. Application Data

(63) Continuation of application No. PCT/JP2021/043913, filed on Nov. 30, 2021.

(30) Foreign Application Priority Data

Dec. 8, 2020 (JP) ................................ 2020-203654

(51) Int. Cl.

*H04W 76/27* (2018.01)
*H04W 76/30* (2018.01)
*H04W 92/20* (2009.01)

(52) U.S. Cl.

CPC .......... *H04W 76/27* (2018.02); *H04W 76/30* (2018.02); *H04W 92/20* (2013.01)

(58) Field of Classification Search

CPC ...... H04W 76/27; H04W 76/30; H04W 92/20
(Continued)

(56) References Cited

U.S. PATENT DOCUMENTS

| | | | | |
|---|---|---|---|---|
| 11,877,165 | B2 * | 1/2024 | Muhammad .......... | H04W 76/19 |
| 2023/0397084 | A1 * | 12/2023 | Shah .................... | H04W 40/12 |

FOREIGN PATENT DOCUMENTS

| | | | |
|---|---|---|---|
| CN | 102932857 | A | 2/2013 |
| CN | 103493537 | A | 1/2014 |

(Continued)

OTHER PUBLICATIONS 63092074P (Year: 2020).*

(Continued)

*Primary Examiner* — Intekhaab A Siddiquee
(74) *Attorney, Agent, or Firm* — Canon U.S.A., Inc. IP Division

(57) ABSTRACT

There is provided a communication apparatus functioning as a node that relays a communication between a User Equipment and a base station. The communication apparatus comprises: decision unit configured to decide, in a state in which the User Equipment and the communication apparatus are Radio Resource Control (RRC)-connected and the communication apparatus is connected to a first base station, whether to switch the base station, to which the User Equipment is connected via the communication apparatus, from the first base station to a second base station; and request unit configured to request, in a case where the decision unit decides to switch the base station connected to the User Equipment to the second base station, the User Equipment to release the RRC connection.

17 Claims, 7 Drawing Sheets

(58) Field of Classification Search
USPC .......................................................... 370/329
See application file for complete search history.

(56) References Cited

FOREIGN PATENT DOCUMENTS

| | | | | | |
|---|---|---|---|---|---|
| JP | 2019-534625 | A | | 11/2019 | |
| JP | 2022007704 | A | | 1/2022 | |
| WO | 2012008382 | A1 | | 1/2012 | |
| WO | 2017/078143 | A1 | | 5/2017 | |
| WO | 2018063892 | A1 | | 4/2018 | |
| WO | WO-2019246446 | A1 | * | 12/2019 | .......... H04W 36/087 |
| WO | 2020006734 | A1 | | 1/2020 | |

OTHER PUBLICATIONS

3GPP, 3rd Generation Partnership Project TR 38.874 0.7.0; Technical Report; Technical Specification Group Radio Access Network; Study on Integrated Access and Backhaul, Release 15, Nov. 2018, France.

Huawei, Miscellaneous Stage 2 change for IAB BL CR to TS38.401, 3GPP TSG-RAN3 Meeting #108-e, Jun. 1-11, 2020.

Sharp, Downstream notification of BH RLF [online], 3GPP TSG RAN WG2 #106 R2-1906397, May 2, 2019, Internet URL:https://www.3gpp.org/ftp/tsg_ran/WG2_RL2/TSGR2_106/Docs/R2-1906397.zip, pp. 1-2.

* cited by examiner

COMMUNICATION APPARATUS, INTEGRATED ACCESS AND BACKHAUL NODE, CONTROL METHOD, AND COMPUTER-READABLE STORAGE MEDIUM

CROSS-REFERENCE TO RELATED APPLICATIONS

This application is a Continuation of International Patent Application No. PCT/JP 2021/043913, filed Nov. 30, 2021, which claims the benefit of Japanese Patent Application No. 2020-203654, filed Dec. 8, 2020, both of which are hereby incorporated by reference herein in their entireties.

BACKGROUND OF THE INVENTION

Field of the Invention

The present invention relates to a wireless communication technique.

Background Art

In the 3rd Generation Partnership Project (3GPP), Integrated Access and Backhaul (IAB) has been standardized as a communication technique for backhaul. The IAB technique is a technique of simultaneously using, as backhaul communication, millimeter wave radio communication in a 28-GHz band or the like used for access communication between a base station and a User Equipment (UE) (PTL 1). In backhaul communication using the IAB technique, a relay apparatus called an IAB node relays, by millimeter wave communication, communication from an IAB donor as a base station. By using the IAB technique, it is possible to widen the coverage of an area at low cost, as compared with wired communication by a conventional optical fiber or the like.

If the IAB technique is used, a Backhaul Radio Link Failure (BH RLF) may occur in backhaul communication and connection between IAB nodes may be disconnected to interrupt the communication. If a BH RLF occurs, the IAB node can recover communication by switching the connection to another connectable IAB node to reestablish backhaul communication. In a case other than the occurrence of a BH RLF as well, a case where it is necessary to change an already established route may occur due to the influence of deterioration of communication quality between the IAB nodes or the like.

CITATION LIST

Patent Literature

PTL 1: Japanese Patent Laid-Open No. 2019-534625
PTL 2: International Publication No. 2017/078143

When switching a connected IAB node, an IAB node may be connected to an IAB node that has established connection to an IAB donor (new IAB donor) different from an IAB donor (old IAB donor) to which connection has been established before switching. In this case, the IAB node stops an operating Distributed Unit (DU) connected to the old IAB donor, and newly activate a DU for connection to the new IAB donor. The newly activated DU establishes connection to the new IAB donor, thereby recovering communication.

On the other hand, UE connected to the IAB node detects the stop of the connection to the IAB node caused by the stop of the DU of the IAB node, and then starts an RLF detection timer. After the RLF detection timer expires, the UE causes a Radio Resource Control (RRC) state to transition to an RRC_IDLE state, and starts reconnection processing to the IAB node, thereby reestablishing connection to the IAB node.

Consider a case where before the RLF detection timer expires in the UE, the IAB node establishes connection to the new IAB donor. In this case, although the IAB node is in a state in which communication with the new IAB donor is possible, the UE cannot be reconnected to the IAB node before the RLF detection timer expires. That is, if switching of the IAB donor to which the IAB node is connected is complete, the UE cannot restart data communication quickly, thereby degrading the usability of the user.

SUMMARY OF THE INVENTION

The present invention has been made in consideration of the above problem, and has an object to provide a technique for quickly restarting communication after the occurrence of a BH RLF.

As a means for achieving the above-described object, a communication apparatus according to the present invention has the following arrangement. That is, there is provided a communication apparatus functioning as a node that relays communication between user equipment and a base station, comprising decision means for deciding, in a state in which the user equipment and the communication apparatus are Radio Resource Control (RRC)-connected and the communication apparatus is connected to a first base station, whether to switch the base station, to which the user equipment is connected via the communication apparatus, from the first base station to a second base station, and request means for requesting, in a case where the decision means decides to switch the base station connected to the user equipment to the second base station, the user equipment to release the RRC connection.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
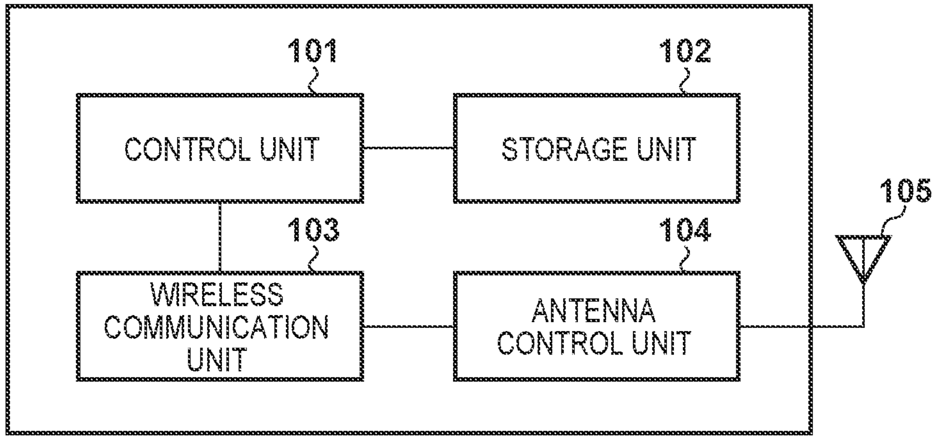
FIG. 1 is a block diagram showing an example of the hardware arrangement of a communication apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment (Configuration of Communication System)

Figure 3:
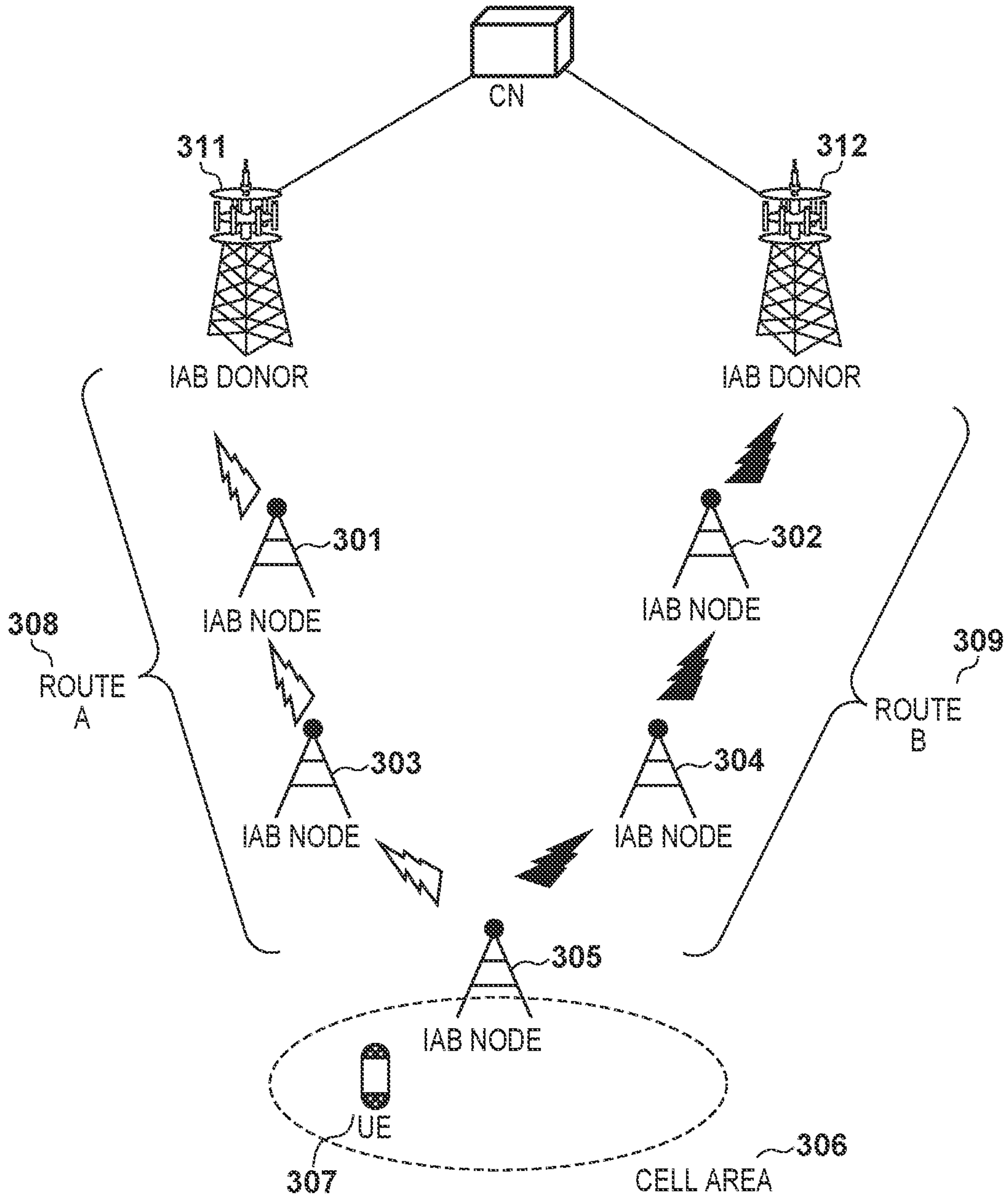
FIG. 3 is a view showing an example of the configuration of a communication system.

FIG. 3 shows an example of the configuration of a communication system according to this embodiment. User Equipment (UE) 307 is located in a cell area 306 managed by an Integrated Access and Backhaul (IAB) node 305, and can be connected to the IAB node 305. In this embodiment, a path (adaptation layer route) of a backhaul network is managed by an IAB donor. For example, in FIG. 3, an IAB donor 311 manages a route A to the UE 307, which is formed from IAB nodes 301 and 303 and the IAB node 305. Furthermore, an IAB donor 312 manages a route B to the UE 307, which is formed from IAB nodes 302 and 304 and the IAB node 305.

A routing table including routing information is set in each node on the route, and is set by the IAB donor. Note that the routing information can include a destination address, a next hop node to which a packet is transferred, a Backhaul (BH) link or Radio Link Control (BH RLC) channel, and a cost measurement reference. Referring to FIG. 3, in each route, one IAB node is connected to the IAB donor and the IAB donor is connected to a Core Network (CN) 310.

In FIG. 3, if a Backhaul Radio Link Failure (BH RLF) occurs between the IAB nodes 305 and 303 under the control of the IAB donor 311, the IAB node 305 needs to migrate the connected IAB node (parent node). The IAB node 305 detects the IAB node 304 in a neighboring cell to set a new backhaul link, thereby establishing a new route (IAB donor 312-IAB node 302-IAB node 304-IAB node 305). In this case, since the IAB donor that establishes the route with the IAB node 305 is switched from the IAB donor 311 to the IAB donor 312, the downstream IAB nodes including the IAB node 305 and all UEs that access the nodes need to execute handover processing.

If the IAB donor is switched, the IAB node 305 stops an operating DU (Distributed Unit) connected to the old IAB donor (IAB donor 311), and newly activates a DU for connection to the new IAB donor (IAB donor 312). Control of the IAB node 305 and each IAB donor is as follows. The IAB donor 311 and the IAB node 305 are connected via other IAB nodes by F1-C association and F1-U tunnel. However, if the new route is established due to a BH RLF, the IAB donor 312 and the IAB node 305 are connected by new F1-C association and F1-U tunnel. This processing updates the connection destination of the DU of the IAB node 305 from the IAB donor 311 to the IAB donor 312. Since the IAB donor 312 updates the routing information by the establishment of the new route, the IP address of each IAB node is updated.

(Arrangement of Communication Apparatus)

FIG. 1 is a block diagram showing an example of the hardware arrangement of a communication apparatus (User Equipment (UE) or IAB node) according to this embodiment. A control unit 101 controls the overall communication apparatus by executing a control program stored in a storage unit 102. The storage unit 102 stores the control program to be executed by the control unit 101, and various kinds of information such as cell information (base station information), connected terminal information, and IAB routing information. Various kinds of operations (to be described later) can be performed when the control unit 101 executes the control program stored in the storage unit 102. A wireless communication unit 103 executes control for cellular network communication such as Long Term Evolution (LTE) or 5G communication complying with the 3rd Generation Partnership Project (3GPP) standard. Note that the wireless communication unit 103 may be configured to execute control for communication complying with a standard of the IEEE802.11 series. An antenna control unit 104 controls an antenna 105 for wireless communication by the wireless communication unit 103. A plurality of antennas 105 may be provided to implement Multi-Input Multi-Output (MIMO) communication or the like.

Figure 2A:
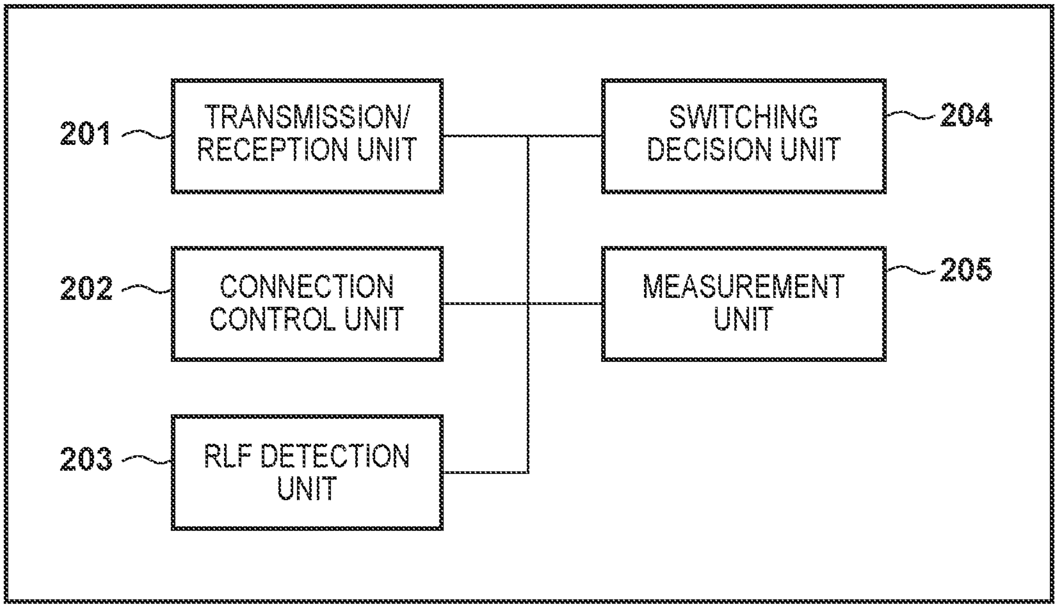
FIG. 2A is a block diagram showing an example of the functional arrangement of the communication apparatus.
Figure 2B:
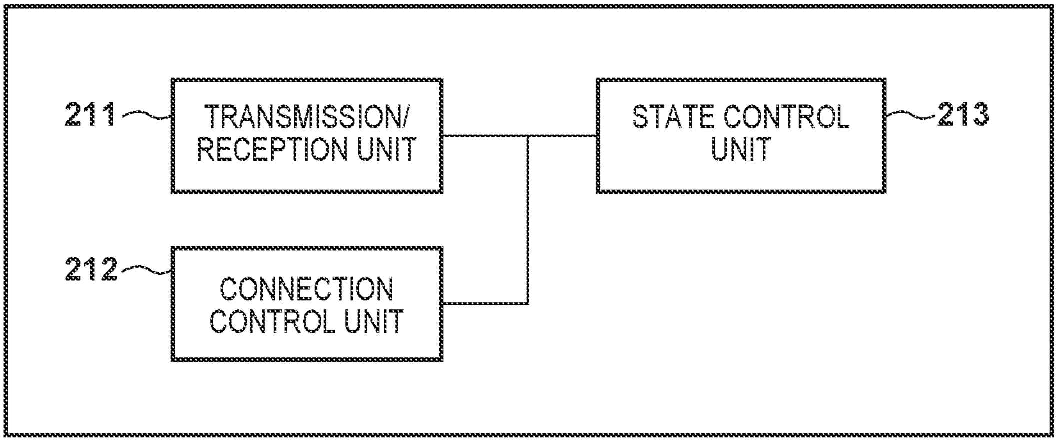
FIG. 2B is a block diagram showing an example of the functional arrangement of the communication apparatus.

FIGS. 2A and 2B are block diagrams each showing an example of the functional arrangement of the communication apparatus (User Equipment (UE) or IAB node) according to this embodiment. FIG. 2A shows an example of the functional arrangement of the IAB node. Referring to FIG. 2A, a transmission/reception unit 201 transmits/receives a message (frame/packet) to/from a communication partner apparatus via the wireless communication unit 103, the antenna control unit 104, and the antenna 105 (FIG. 1). The transmission/reception unit 201 may perform message generation processing (at the time of transmission) and analysis processing (at the time of reception). A connection control unit 202 controls connection to the communication partner apparatus. For example, the connection control unit 202 can request to establish/release connection to the communication partner apparatus via the transmission/reception unit 201. An RLF detection unit 203 detects (senses) a radio failure in a physical layer, which occurs with the communication partner apparatus. A switching decision unit 204 decides to switch the connected IAB donor due to a change of a communication route. A measurement unit 205 measures (derives) the strength and/or quality (Received Signal Strength Indicator/Indication (RSSI), Reference Signal Received Quality (RSRQ), Reference Signal Received Power (RSRP), Signal to Interference plus Noise Ratio (SINR), or the like) of a received signal from the communication partner apparatus.

FIG. 2B shows an example of the functional arrangement of the UE. Referring to FIG. 2B, a transmission/reception unit 211 transmits/receives a message (frame/packet) to/from a communication partner apparatus via the wireless communication unit 103, the antenna control unit 104, and the antenna 105 (FIG. 1). The transmission/reception unit 211 may perform message generation processing (at the time of transmission) and analysis processing (at the time of reception). A connection control unit 212 controls connection to the communication partner apparatus. For example, the connection control unit 202 can request to establish/release connection to the communication partner apparatus via the transmission/reception unit 211. A state control unit 213 executes state control including transition of the state of the UE.

(Processing of IAB Node)

Figure 4:
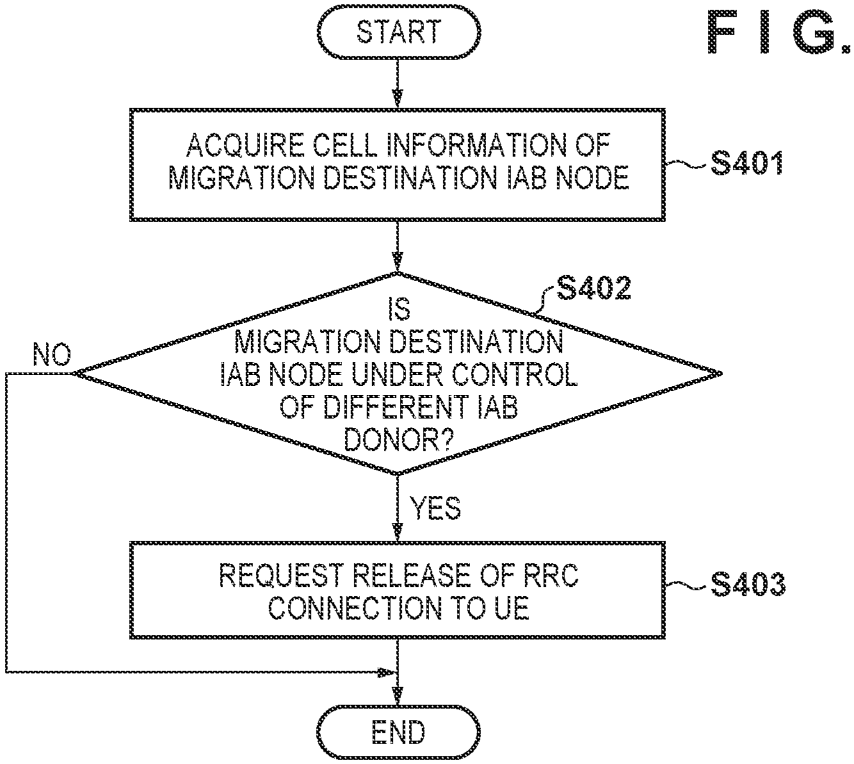
FIG. 4 is a flowchart illustrating processing executed by an IAB node according to the first embodiment.

Subsequently, the processing of the IAB node along with the presence/absence of switching of the IAB donor will be described. FIG. 4 is a flowchart illustrating processing executed by the IAB node according to this embodiment. In this example, this processing will be described as processing executed by the IAB node 305 in the communication system shown in FIG. 3. Assume that the IAB node 305 is Radio Resource Control (RRC)-connected to the UE 307.

If the RLF detection unit 203 of the IAB node 305 detects a BH RLF with the IAB node 303, the connection control unit 202 changes the connected IAB node (parent node). In this example, the connection control unit 202 of the IAB node 305 establishes synchronization with the IAB node 304 as a new parent node (migration destination IAB node), and performs Random Access Channel (RACH) processing, thereby performing connection. After that, the transmission/reception unit 201 of the IAB node 305 acquires cell information from the IAB node 304 (step S401). For example, the IAB node 305 acquires a Physical Cell Indicator (PCI) included in a notification signal transmitted from the IAB node 304. Then, the switching decision unit 204 of the IAB node 305 compares the PCI with a PCI as cell information already acquired from the IAB node 303. By this comparison processing, the switching decision unit 204 of the IAB node 305 determines whether the IAB donor to which the parent node is connected is switched (route/cell is different) before and after the parent node is changed. That is, it is determined whether the migration destination IAB node is under the control of the IAB donor that is different from that before the migration.

If, for example, the PCIs match each other, and it is decided that the migration destination IAB node is under the control of the IAB donor that is the same as that before the migration (NO in step S402), the process ends. On the other hand, if, for example, the PCIs do not match each other, and it is decided that the migration destination IAB node is under the control of the IAB donor that is different from that before the migration (YES in step S402), the process advances to step S403. At this time, the IAB node 305 recognizes that the UE 307 needs to execute handover processing.

In step S403, the connection control unit 202 of the IAB node 305 requests the UE 307 to release the RRC connection. This request can be issued when the connection control unit 202 transmits an RRC connection release request message via the transmission/reception unit 201. The RRC connection release request message may be an RRC Release message standardized in the 3GPP specification. Note that the message for requesting to release the RRC connection may be added with a frequency list for priority connection. Thus, the UE after the release can perform connection by prioritizing a frequency set in the frequency list. Note that the IAB node 305 may request to release the RRC connection by another method, for example, by transmitting, to the UE 307, a unique message for requesting to release the RRC connection.

Note that if there exists an IAB node (child node) on the downstream side of a section where a BH RLF occurs (after the determination processing in step S403), the IAB node 305 may request the child node to release the RRC connection for the accessing UE. If connection to the new IAB donor (the IAB donor 312 in the example shown in FIG. 3) is established after requesting the UE 307 or the like to release the RRC connection, the connection control unit 202 of the IAB node 305 may notify the UE 307, in the lower layer, via the transmission/reception unit 201, that the connection to the new IAB donor is established.

(Processing of UE)

Figure 5:
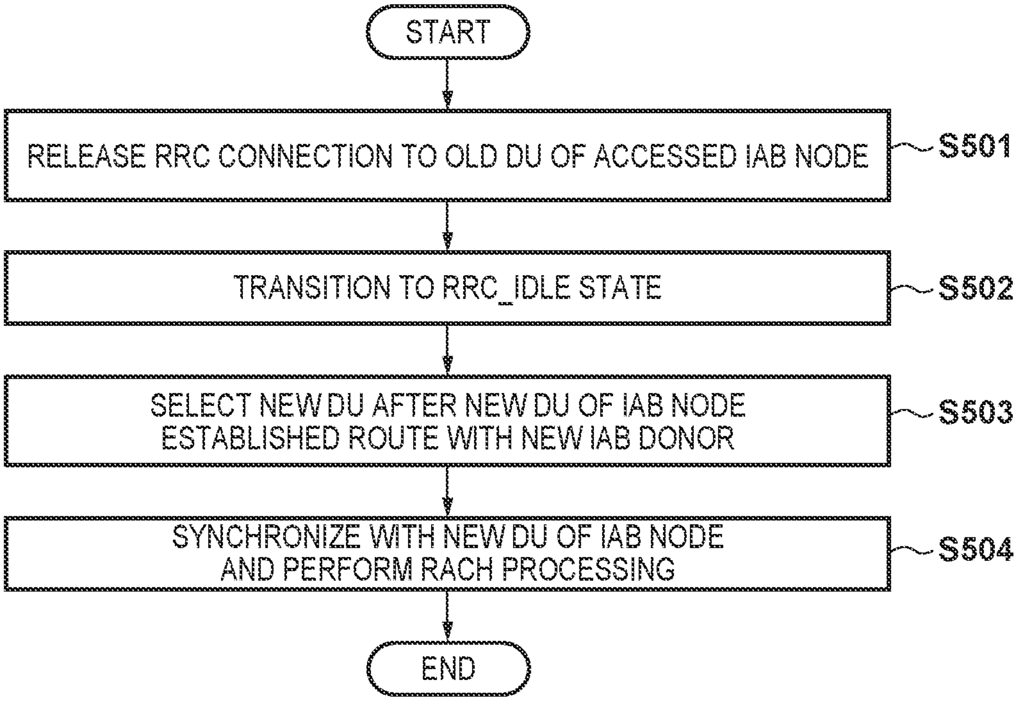
FIG. 5 is a flowchart illustrating processing executed by UE.

Next, the processing of the UE at the time of switching the IAB donor will be described. FIG. 5 is a flowchart illustrating the processing executed by the UE according to this embodiment. In this example, this processing will be described as processing executed by the UE 307 in the communication system shown in FIG. 3. Assume that the UE 307 is RRC-connected to the IAB node 305.

Note that in the following description, in the IAB node 305, the DU for connection to the old IAB donor will be referred to as the old DU, and the DU for connection to the new IAB donor will be referred to as the new DU. As described in PTL 2, UE can transition from an RRC_IDLE (idle) state as a standby state to an RRC_CONNECTED (connected) state (can be RRC-connected to a base station) by reusing context information.

If the transmission/reception unit 211 of the UE 307 receives the RRC connection release request message from the IAB node 305 by the processing in step S403 of FIG. 4, the connection control unit 212 releases the RRC connection to the old DU of the accessed IAB node 305 (step S501). After the RRC connection is released, the state control unit 213 of the UE 307 causes the state of the UE 307 to transition from the RRC_CONNECTED state to the RRC_IDLE state as the IDLE standby state (step S502). Since the UE is in the standby state, it maintains the standby state until, for example, reception power from the base station (the IAB node in this example) satisfies a predetermined reference value. Although described later with reference to FIG. 6, the IAB node 305 starts F1-C connection to the IAB donor 312 as the new IAB donor by a DU setup procedure while the UE is in the RRC_IDLE state (F609 of FIG. 6). If the connection is established, the new DU of the IAB node 305 completes the connection to the IAB donor 312, and thus can access the UE 307.

After the new DU of the IAB node 305 completes the connection to the IAB donor 312, the connection control unit 212 of the UE 307 is in the RRC_IDLE state, and thus quickly detects (finds) and selects the new DU of the IAB node 305 without occurrence of a problem in a radio unit (step S503). After that, the connection control unit 212 of the UE 307 establishes synchronization with the new DU of the IAB node 305, and performs RACH processing (step S504). Note that if the transmission/reception unit 211 of the UE 307 receives, from the IAB node 305, the notification that the connection to the new IAB donor (the IAB donor 312 in the example shown in FIG. 3) is established, the UE 307 may perform processes in steps S503 and S504.

(Communication Sequence in Communication System)

Figure 6:
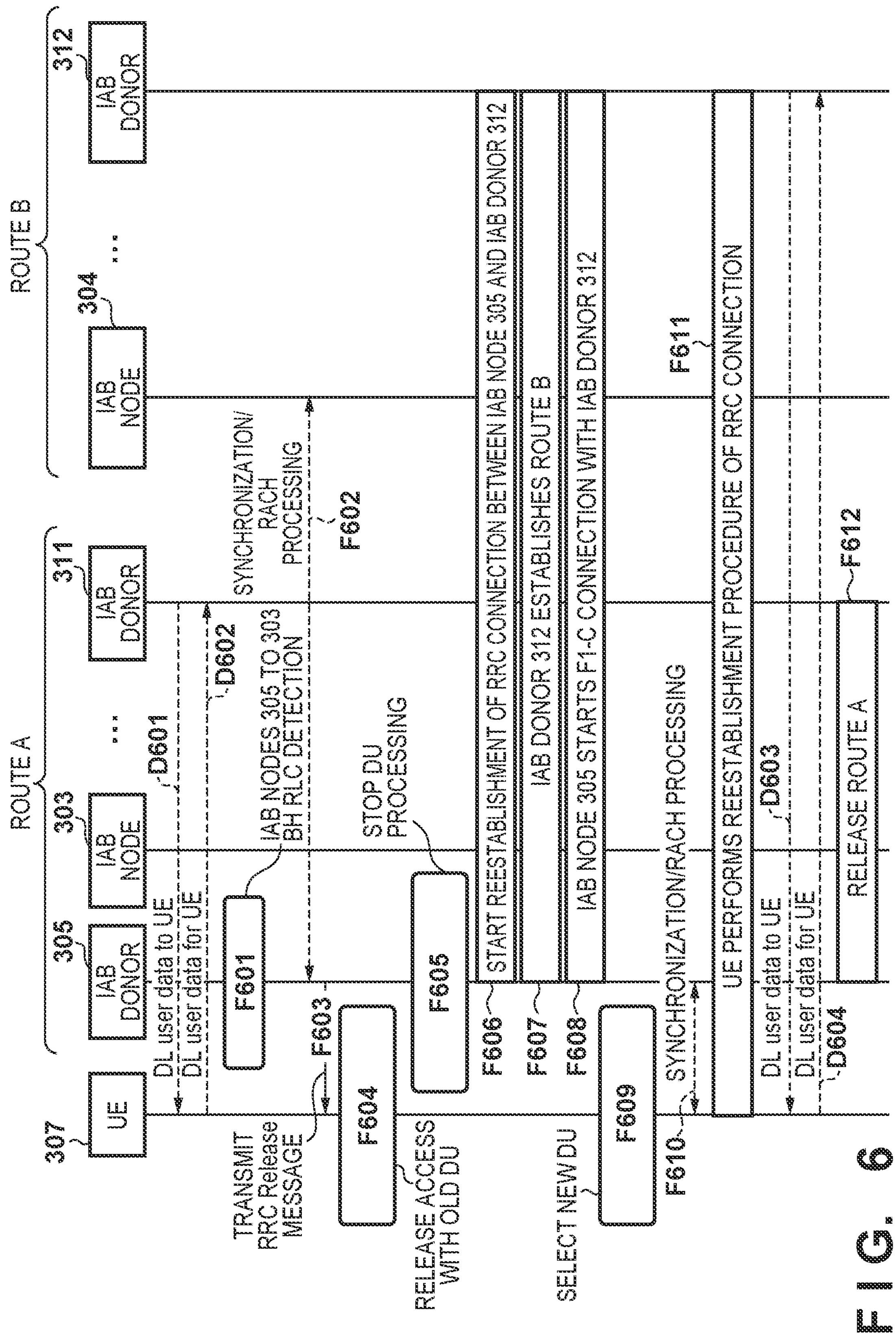
FIG. 6 is a sequence chart showing a communication sequence according to the first embodiment.

FIG. 6 is a sequence chart showing a communication sequence according to this embodiment. Assume that the UE 307 is RRC-connected in the route A. The UE 307 performs data communication with the IAB donor 311 via the route A (D601 and D602). If a radio failure in the physical layer with the IAB node 303 is detected, the IAB node 305 activates the timer. If, after the activation of the timer, the failure is not recovered within the timer time (predetermined time), the IAB node 305 detects a BH RLF, and declares it (F601).

Although the IAB node 305 loses the parent node of the connection destination due to the radio failure of backhaul, it establishes synchronization, performs RACH processing, and is connected to the IAB node 304 as the new parent node (F602). The synchronization establishment and the RACH processing are the same as a procedure in which the normal UE finds a connection destination cell by a cell search and performs connection. After switching of the IAB donor is determined (YES in step S402), the IAB node 305 transmits an RRC connection release request message (for example, an RRC Release message standardized in the 3GPP specification) to the UE 307 (F603 and step S403).

Upon receiving the RRC connection release request message from the IAB node 305, the UE 307 executes access (RRC connection) release processing with the old DU of the IAB node 305 (F604). Subsequently, the IAB node 305 stops DU processing due to the influence of the BH RLF (F605). In the conventional method, the UE 307 continues accessing the old DU of the IAB node 305, causing a radio problem. In the conventional method, if a radio problem occurs in the UE 307, a T1 timer is activated at the time of the occurrence of the radio problem, and an attempt is made to perform connection to a connectable cell when the T1 timer expires. If, however, connection to the cell cannot be established, an RLF is declared. On the other hand, in this embodiment, the UE 307 and the IAB node 305 operate as follows.

The IAB node 305 starts to reestablish RRC connection (RRC-Connection-Reestablishment) with the IAB donor 312 as the new IAB donor (F606). Thus, the IAB donor 312 establishes the new route B with the IAB node 305 via the IAB nodes 302 and 304 (F607). Subsequently, the IAB node 305 starts F1-C connection to the IAB donor 312 by a DU setup procedure (F608). As a result, the new DU of the IAB node 305 completes connection to the IAB donor 312, and can access the UE 307.

The UE 307 is in the RRC_IDLE state (standby state), and thus quickly detects (finds) and selects the DU of the IAB node 305 without occurrence of a problem in a radio unit (F609). After that, the UE 307 establishes synchronization with the IAB node 305, and performs RACH processing (F610). Then, the UE 307 executes RRC connection reestablishment processing with the IAB donor 312 (F611). After the completion of the RRC connection reestablishment processing, the UE 307 can restart data communication with the IAB donor 312 (D603 and D604).

After that, the IAB donor 311 releases the route A of the old adaptation layer route via the IAB nodes 303 and 301 on wireless backhaul between the IAB node 305 and the IAB donor 311. Furthermore, the IAB donor 311 releases a forwarding entry in fronthaul on the old route on the wireless backhaul (F612).

As described above, according to this embodiment, upon detecting a BH RLF, the IAB node 305 stops the DU processing, and sends the RRC connection release request to the connected UE 307. This causes the UE 307 to perform the access release processing with the DU of the IAB node 305. Then, after the IAB node 305 establishes a route with the new IAB donor, the UE 307 can quickly detect and select the new DU (the DU for which the connection destination is updated to the IAB donor 312) of the IAB node, and start connection. As a result, as compared with the conventional method, after occurrence of a BH RLF, the UE 307 can be connected to the IAB node more quickly to restart data communication.

Second Embodiment

The second embodiment will be described next. The configuration of a communication system and the arrangement of each communication apparatus according to this embodiment are the same as in the first embodiment and a description thereof will be omitted.

(Processing of IAB Node)

Figure 7:
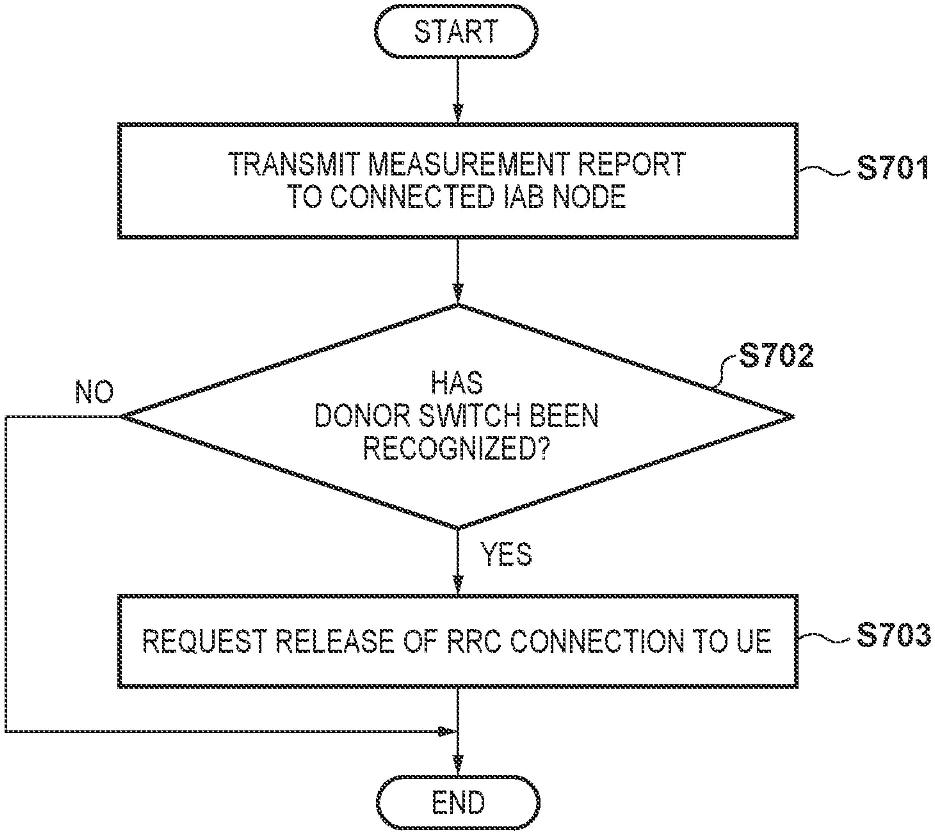
FIG. 7 is a flowchart showing processing executed by an IAB node according to the second embodiment.

Processing of an IAB node along with the presence/absence of switching of an IAB donor will be described. FIG. 7 is a flowchart illustrating processing executed by an IAB node according to this embodiment. In this example, this processing will be described as processing executed by an IAB node 305 in the communication system shown in FIG. 3.

A measurement unit 205 of the IAB node 305 measures the strength and/or quality (RSSI or the like) of a received signal. Subsequently, a transmission/reception unit 201 of the IAB node 305 transmits a measurement report message including information (measurement information) of the measurement to an IAB node 303 as a connected IAB node (parent node) (step S701). The transmitted measurement report is used by an IAB donor 311 to determine whether to execute handover from the IAB donor 311 to an IAB donor 312. If it is determined, based on the measurement report, to execute handover, the IAB donor 311 transmits an RRC Reconfiguration message to the IAB node 305 via the IAB node 303. These processes will be described later with reference to FIG. 8.

If a switching decision unit 204 of the IAB node 305 recognizes to switch the IAB donor by receiving the RRC Reconfiguration message from the IAB node 303 via the transmission/reception unit 201 (YES in step S702), it decides to switch the IAB donor and the process advances to step S703. Processing in step S703 is the same as that in step S403 of FIG. 4 described in the first embodiment and a description thereof will be omitted. On the other hand, if the IAB node 305 does not recognize to switch the IAB donor by not receiving the RRC Reconfiguration message within a predetermined time (NO in step S702), the process ends.

(Processing of UE)

The processing of UE at the time of switching the IAB donor is the same as that shown in FIG. 5 described in the first embodiment and a description thereof will be omitted.

(Communication Sequence in Communication System)

Figure 8:
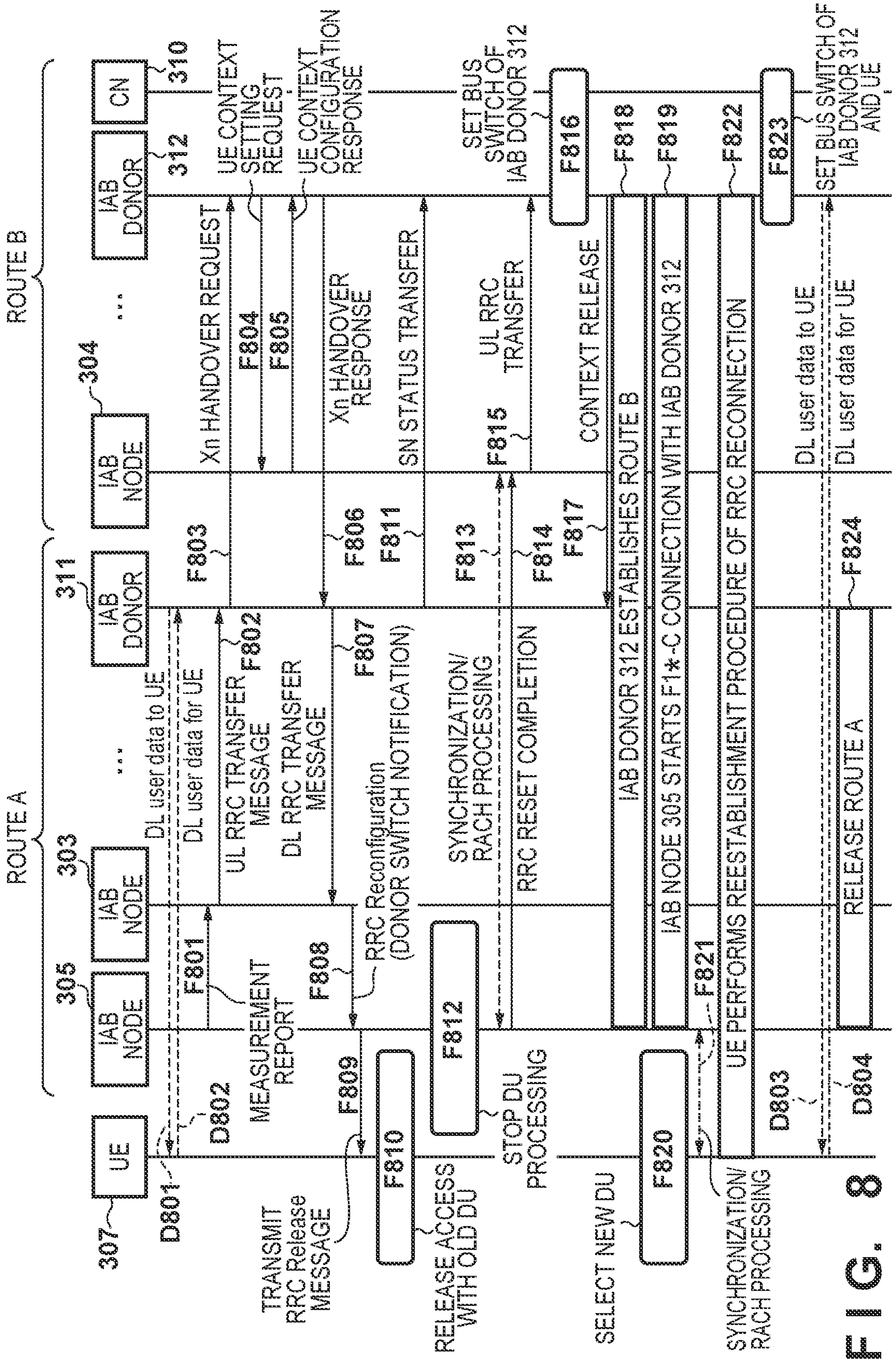
FIG. 8 is a sequence chart showing a communication sequence according to the second embodiment.

FIG. 8 is a sequence chart showing a communication sequence according to this embodiment. UE 307 performs data communication with the IAB donor 311 via a route A (D801 and D802). The IAB node 305 transmits, to the IAB node 303, a measurement report message including measurement information such as RSSI (F801). The measurement report message may be transmitted at a predetermined timing, periodically, or in response to a request from the IAB node 303. Subsequently, the IAB node 303 transmits the received measurement report message to the IAB donor 311 by an RRC transfer message (F802).

Based on the measurement report received from the IAB node 305, the IAB donor 311 determines whether to execute handover from the IAB node 303 to an IAB node 304. If it is decided to execute handover, the IAB donor 311 transmits an Xn handover request message to the IAB donor 312, thereby starting handover preparation. Handover preparation is performed for all the access UEs and IAB nodes (F803). The IAB donor 312 transmits a UE context setup (setting) request message to the target IAB node 304, creates an MT (Mobile Termination (one function on the IAB node)) context, and sets one or more bearers (F804). The IAB node 304 responds to the IAB donor 312 by a UE context setup response message (F805). The IAB donor 312 responds to the IAB donor 311 by an Xn handover request response message (F806).

The IAB donor 311 transmits a UE context change request message to the IAB node 303. This message includes the RRC Reconfiguration message generated for MT of the IAB node 305 (F807). The IAB node 303 transfers the received RRC Reconfiguration message to the IAB node 305.

The IAB node 305 recognizes (decides) to switch to another IAB donor by the received RRC Reconfiguration message (F808). The IAB node 305 transmits an RRC connection release request message (for example, an RRC Release message standardized in the 3GPP specification) to the UE 307 (F809 and step S703). As described in the first embodiment, the RRC connection release request message may be added with a frequency list (information) for priority connection. Thus, the UE after the RRC release can perform connection by prioritizing a frequency set in the frequency list.

Upon receiving the RRC connection release request message from the IAB node 305, the UE 307 executes release processing with the old DU of the IAB node 305 (F810). The IAB donor 311 transmits an SN status transfer message to the IAB donor 312 (F811). The DU on the IAB node 305 loses F1*-C connection to the IAB donor 311, and thus stops a service (DU processing) (F812). In the conventional method, the UE 307 continues accessing the old DU of the IAB node 305, causing a radio problem. In the conventional method, if a radio problem occurs in the UE 307, a T1 timer is activated at the time of the occurrence of the radio problem, and an attempt is made to perform connection to a connectable cell when the T1 timer expires. If, however, connection to the cell cannot be established, an RLF is declared. On the other hand, in this embodiment, the UE 307 and the IAB node 305 operate as follows.

The IAB node 305 detects the IAB node 304, establishes synchronization, and performs RACH processing (F813). Subsequently, the IAB node 305 transmits an RRC Reconfiguration Complete message to the IAB node 304 (F814). The DU of the IAB node 304 transfers the RRC Reconfiguration Complete message to the IAB donor 312 via UL RRC transfer (F815). The IAB donor 312 executes a path switch procedure for the CN 310 and the IAB node 305 (F816). After the completion of the path switch procedure, the IAB donor 312 transmits a context release request message to the IAB donor 311 (F817).

The IAB donor 312 sets a new adaptation layer route on wireless backhaul with the IAB node 305 that migrates via the target IAB node 304. As a result, a new route B is established (F818). The DU on the IAB node 305 starts new F1*-C connection to the IAB donor 312 (F819). As a result, the service of the DU restarts, and thus the new DU of the IAB node 305 can access the UE 307.

The UE 307 is in the RRC_IDLE state (standby state), and thus quickly detects (finds) and selects the DU of the IAB node 305 without occurrence of a problem in a radio unit (F820). After that, the UE 307 establishes synchronization with the IAB node 305, and performs RACH processing (F821). Then, the UE 307 executes RRC connection reestablishment processing (F822). The IAB donor 312 executes path switching of the UE 307 using the CN 310 (F823). After that, the UE 307 can restart data communication with the IAB donor 312 (D803 and D804). Processing in F824 is the same as in F612 of FIG. 6 and a description thereof will be omitted.

As described above, according to this embodiment, if it is decided to switch the IAB donor based on the measurement information by the IAB node 305, the IAB node 305 sends an RRC connection release request to the connected UE 307. This causes the UE 307 to perform access release processing with the DU of the IAB node 305. Then, after the IAB node 305 establishes a route with the new IAB donor, the UE 307 can quickly select the new DU (the DU for which the connection destination is updated to the IAB donor 312) of the IAB node, and start connection. As a result, in accordance with the change of the radio state, the UE 307 can be connected to the IAB node more quickly to restart data communication.

According to the present invention, there is provided a technique for quickly restarting communication after occurrence of a BH RLF.

Other features and advantages of the present invention will be apparent from the following description taken in conjunction with the accompanying drawings. Note that the same reference numerals denote the same or like components throughout the accompanying drawings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus functioning as a node that relays a communication between User Equipment and a base station, comprising:

at least one processor; and at least one memory coupled to the at least one processor and having instructions stored thereon, and when executed by the at least one processor, causing the communication apparatus to:

decide, in a state in which the User Equipment and the communication apparatus are Radio Resource Control (RRC)-connected and the communication apparatus is connected to a first Integrated Access and Backhaul (IAB) donor, whether to switch the base station, to which the User Equipment is connected via the communication apparatus, from the first IAB donor to a second IAB donor; and request, in a case where the communication apparatus decides to switch the base station connected to the User Equipment to the second IAB donor, the User Equipment to release the RRC connection.

2. The communication apparatus according to claim 1, wherein the communication apparatus has established a wireless link with another node, and the instructions further cause the communication apparatus, when executed by the at least one processor, to:

detect, via the wireless link, a Radio Link Failure (RLF) between the first IAB donor and the communication apparatus;

establish, in a case where the RLF is detected, a wireless link with a second another node which is a node different from the other node; and acquire, after the establishment of the wireless link with the second other node, from the second other node, information of a base station to which the second other node is connected, wherein in a case where the communication apparatus acquires information indicating that the second other node is connected to the second IAB donor, the communication apparatus decides to switch the connection between the User Equipment and the base station to the second IAB donor.

3. The communication apparatus according to claim 2, wherein the information of the base station to which the second other node is connected comprises a Physical Cell Indicator (PCI).

4. The communication apparatus according to claim 1, wherein the communication apparatus has established a wireless link with another node, and the instructions further cause the communication apparatus, when executed by the at least one processor, to:

transmit, to the first IAB donor, a measurement report indicating strength and/or quality of a received signal in the wireless link measured by the communication apparatus; and receive a reconfiguration message from the first IAB donor after the transmission of the measurement report, wherein in a case where it is recognized, by the reconfiguration message, to switch the base station connected to the User Equipment to the second IAB donor, the communication apparatus decides to switch the connection between the User Equipment and the base station to the second IAB donor.

5. The communication apparatus according to claim 1, wherein the communication apparatus requests, by transmitting a predetermined message, the User Equipment to release the RRC connection.

6. The communication apparatus according to claim 5, wherein the predetermined message is added with information of a frequency to which the User Equipment should connect preferentially.

7. The communication apparatus according to claim 1, wherein the instructions further cause the communication apparatus, when executed by the at least one processor, to:

establish connection to the second IAB donor after the communication apparatus requests the User Equipment to release the RRC connection; and notify, in a case where the communication apparatus establishes the connection to the second IAB donor, the User Equipment that the connection to the second IAB donor is established.

8. The communication apparatus according to claim 1, wherein the communication apparatus functions as an IAB node and forwards data received from the User Equipment to the base station via wireless communication.

9. A communication apparatus connected to a base station via another communication apparatus functioning as a node, comprising:

at least one processor; and at least one memory coupled to the at least one processor and having instructions stored thereon, and when executed by the at least one processor, causing the communication apparatus to:

receive, in an RRC_CONNECTED state in which the other communication apparatus connected to a first Integrated Access and Backhaul (IAB) donor is Radio Resource Control (RRC)-connected, a request to release the RRC connection from the other communication apparatus that has decided to change the connection from the first IAB donor to a second IAB donor;

release the RRC connection in a case where the communication apparatus receives the request;

change, in response to the release of the RRC connection, a state of the communication apparatus from the RRC_CONNECTED state to an RRC_IDLE state; and detect the other communication apparatus and starting connection in the RRC_IDLE state.

10. The communication apparatus according to claim 9, wherein in a case where the communication apparatus receives, from the other communication apparatus, information indicating that the other communication apparatus has established connection to the second IAB donor, the communication apparatus detects the other communication apparatus and starts connection.

11. An Integrated Access and Backhaul (IAB) node relaying a communication between a User Equipment and an IAB donor, comprising:

at least one processor; and at least one memory coupled to the at least one processor and having instructions stored thereon, and when executed by the at least one processor, causing the IAB node to:

establish a communication with the User Equipment; and differentiate, in a case where an upper IAB node that relays a communication to the IAB donor is switched from a first other IAB node to a second other IAB node, based on information associated with a communication, whether or not to transmit a request for releasing a Radio Resource Control (RRC) connection to a User Equipment which is establishing a communication with the IAB node.

12. The IAB node according to claim 11, wherein the IAB node transmits, in a case of determining that the second other IAB node is an IAB node under the control of another IAB donor different from the IAB donor based on information associated with the communication, a request for releasing a RRC connection to a User Equipment which is establishing a communication with the IAB node.

13. A control method for a communication apparatus functioning as a node that relays a communication between a User Equipment and a base station, comprising:

deciding, in a state in which the User Equipment and the communication apparatus are Radio Resource Control (RRC)-connected and the communication apparatus is connected to a first Integrated Access and Backhaul (IAB) donor, whether to switch the base station, to which the User Equipment is connected via the communication apparatus, from the first IAB donor to a second IAB donor; and requesting, in a case where it is decided to switch the base station connected to the User Equipment to the second IAB donor, the User Equipment to release the RRC connection.

14. A control method for a communication apparatus connected to a base station via another communication apparatus functioning as a node, comprising:

receiving, in an RRC_CONNECTED state in which the communication apparatus connected to a first Integrated Access and Backhaul (IAB) donor is Radio Resource Control (RRC)-connected, a request to release the RRC connection from the other communication apparatus that has decided to change the connection from the first IAB donor to a second IAB donor;

releasing the RRC connection in a case where the request is received;

changing, in response to the release of the RRC connection, a state of the communication apparatus from the RRC_CONNECTED state to an RRC_IDLE state; and detecting the other communication apparatus and starting connection in the RRC_IDLE state.

15. A control method for providing a communication function of an Integrated Access and Backhaul (IAB) node that relays a communication between User Equipment and a base station, comprising:

controlling an antenna; and performing a control for, in a case where an upper IAB node that relays a communication to the IAB donor is switched from a first other IAB node to a second other IAB node, differentiating, based on information associated with a communication, whether or not to transmit a request for releasing a Radio Resource Control (RRC) connection to a User Equipment which is establishing a communication with the IAB node.

16. A non-transitory computer-readable storage medium of storing a computer-executable program to achieve a control method of a communication apparatus functioning as a node that relays a communication between a User Equipment and a base station, comprising:

deciding, in a state in which the User Equipment and the communication apparatus are Radio Resource Control (RRC)-connected and the communication apparatus is connected to a first Integrated Access and Backhaul (IAB) donor, whether to switch the base station, to which the User Equipment is connected via the communication apparatus, from the first IAB donor to a second IAB donor; and requesting, in a case where it is decided to switch the base station connected to the User Equipment to the second IAB donor, the User Equipment to release the RRC connection.

17. A non-transitory computer-readable storage medium of storing a computer-executable program to achieve a control method for providing a communication function of an Integrated Access and Backhaul (IAB) node that relays a communication between a User Equipment and a base station, comprising:

controlling an antenna; and performing a control for, in a case where an upper IAB node that relays a communication to the IAB donor is switched from a first other IAB node to a second other IAB node, differentiating, based on information associated with a communication, whether or not to transmit a request for releasing a Radio Resource Control (RRC) connection to a User Equipment which is establishing a communication with the IAB node.

* * * * *